United States Patent
Iwata et al.

(10) Patent No.: US 11,485,124 B1
(45) Date of Patent: Nov. 1, 2022

(54) LAMINATING APPARATUS AND LAMINATING METHOD USING SAME

(71) Applicant: Nikko-Materials Co., Ltd., Yokohama (JP)

(72) Inventors: Kazutoshi Iwata, Kanagawa (JP); Yoshiaki Honma, Kanagawa (JP); Takeshi Yamaguchi, Kanagawa (JP); Taihei Matsumoto, Kanagawa (JP)

(73) Assignee: NIKKO-MATERIALS CO., LTD., Yokohama (JP)

( * ) Notice: Subject to any disclaimer, the term of this patent is extended or adjusted under 35 U.S.C. 154(b) by 0 days.

(21) Appl. No.: 17/389,079

(22) Filed: Jul. 29, 2021

(51) Int. Cl.
    B32B 41/00     (2006.01)
    B32B 37/06     (2006.01)
    B32B 37/00     (2006.01)

(52) U.S. Cl.
    CPC .......... *B32B 37/06* (2013.01); *B32B 37/0007* (2013.01); *B32B 37/0046* (2013.01); *B32B 41/00* (2013.01)

(58) Field of Classification Search
    CPC . B32B 37/06; B32B 37/0007; B32B 37/0046; B32B 41/00
    USPC .................. 156/60, 64, 350, 351, 378, 379
    See application file for complete search history.

(56) References Cited

U.S. PATENT DOCUMENTS

| | | | |
|---|---|---|---|
| 7,417,206 B2 * | 8/2008 | Nakamura | H01L 21/67103 219/544 |
| 2008/0041528 A1 * | 2/2008 | Chikaki | B32B 17/10871 156/359 |
| 2015/0021829 A1 * | 1/2015 | Nakahashi | B29C 43/021 264/331.11 |
| 2017/0213751 A1 * | 7/2017 | Oohashi | H01L 22/26 |
| 2018/0162111 A1 * | 6/2018 | Iwata | B32B 37/1054 |

FOREIGN PATENT DOCUMENTS

| | | |
|---|---|---|
| JP | 62-062740 | 3/1987 |
| JP | 62-234695 | 10/1987 |
| JP | 4-182100 | 6/1992 |
| JP | 05-293895 | 11/1993 |
| JP | 2003-217799 | 7/2003 |
| JP | 2021-062522 | 4/2021 |
| WO | 2016/199687 | 12/2016 |

* cited by examiner

Primary Examiner — Michael N Orlando
Assistant Examiner — Joshel Rivera
(74) Attorney, Agent, or Firm — Wenderoth, Lind & Ponack, L.L.P.

(57) ABSTRACT

A laminating apparatus that prevents partial protrusion of a film during pressing and ensures the uniformity of the thickness of a resulting laminate is provided. The laminating apparatus includes a pressing device for pressing a substrate and a film (a workpiece). The pressing device includes a press block movable back and forth, a pressing plate mountable to the press block, a plurality of heat sources (cartridge heaters) capable of heating the pressing plate, and a control system set up to perform heating control on the heat sources. The heat sources are arranged so as to be able to separately heat a central portion of the pressing plate and a peripheral portion thereof annularly surrounding the central portion.

11 Claims, 8 Drawing Sheets

RELATED ART

LAMINATING APPARATUS AND LAMINATING METHOD USING SAME

TECHNICAL FIELD

The present disclosure relates to a laminating apparatus for laminating a substrate and a film together. More particularly, the present disclosure relates to a laminating apparatus capable of making the thickness of a resulting laminate more uniform when manufacturing the laminate comprised of a substrate (e.g., a printed circuit board and a wafer) and a resin film.

BACKGROUND ART

In an apparatus for laminating a substrate having irregularities resulting from interconnections and the like and a resin film together, a variety of contrivances have been hitherto made to make the thickness of resulting laminates uniform (as disclosed, for example, in International Publication No. WO 2016/199687) because variations in the thickness of the resulting laminates cause quality deficiencies and unnecessary space when the laminates are stacked in multiple layers, which results in a bulky stack.

One of these contrivances is that, when a film made of resin is pressed with a heated pressing plate, the surface temperature of the pressing plate is generally made as uniform as possible so that the heat is transferred evenly over the entire surface of the film. It is, however, difficult to achieve a uniform temperature over the entire surface of the pressing plate because the pressing plate typically has a large surface area.

Figure 8:
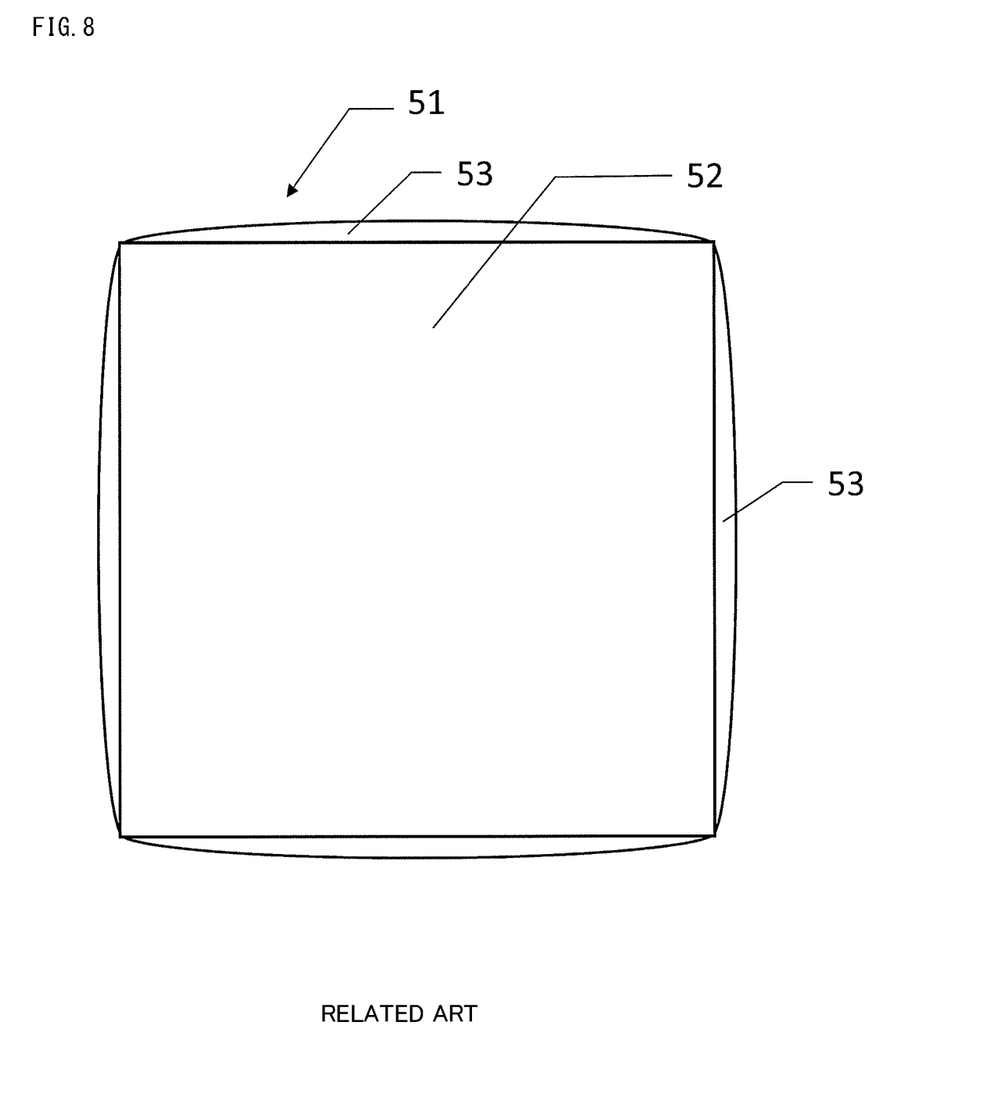
FIG. 8 is a view illustrating a laminate manufactured by a related art laminating apparatus.

For this reason, even if the surface temperature of the pressing plate is set to be uniform, the uniformity is not precisely achieved. As schematically shown in FIG. 8, when a laminate 51 is manufactured by pressing a substrate 52 and a film 53 with the pressing plate, there are cases in which edge portions of the film 53 partially protrude from the substrate 52 (i.e., bleeding occurs). As technology advances, the allowable range of the bleeding is narrowing. There is apprehension that even slight edge portions of the film 53 protruding from the substrate 52 cause the film 53 and the like in the laminate 51 to go beyond the allowable range of thickness uniformity. Thus, there is a strong need for measures to counter this problem.

SUMMARY

In view of the foregoing, it is therefore an object of the present disclosure to provide a laminating apparatus that prevents partial protrusion of a film during pressing and ensures the uniformity of the thickness of the film and the like to thereby achieving the uniformity of the thickness of a laminate more precisely.

To accomplish the aforementioned object, the subject matter of the present disclosure has the following aspects [1] to [8].

[1] A laminating apparatus comprising a pressing device for pressing a substrate and a film, the pressing device including a press block movable back and forth, a pressing plate mountable to the press block, a plurality of heat sources capable of heating the pressing plate, and a control system configured to perform heating control on the heat sources, wherein the heat sources are capable of separately heating a central portion of the pressing plate and a peripheral portion thereof annularly surrounding the central portion.

[2] The laminating apparatus according to the aspect [1], wherein the heating control is performed so that the central portion and the peripheral portion of the pressing plate are at temperatures different from each other.

[3] The laminating apparatus according to the aspect [1], wherein the heating control is performed so that the central portion and the peripheral portion of the pressing plate are at the same temperature.

[4] The laminating apparatus according to any one of the aspects [1] to [3], wherein the peripheral portion of the pressing plate is divided into a plurality of divisions, wherein the divisions are provided with respective different heat sources and control systems, and wherein the heating control of the heat sources is allowed for each of the divisions.

[5] A method of laminating a substrate and a film through the use of a laminating apparatus as recited in the aspect [1], the method comprising the steps of: heating the pressing plate with the plurality of heat sources; and pressing the substrate and the film with the heated pressing plate, wherein heating control is performed so that the central portion of the pressing plate and the peripheral portion thereof annularly surrounding the central portion are at temperatures different from each other in the step of heating the pressing plate.

[6] The method according to the aspect [5], wherein the heating control is performed so that a temperature difference between the central portion and the peripheral portion of the pressing plate is 0.1° to 50° C. in the step of heating the pressing plate.

[7] The method according to the aspect [5] or [6], wherein the temperature of the peripheral portion of the pressing plate is set lower than that of the central portion thereof.

[8] A method of laminating a substrate and a film through the use of a laminating apparatus as recited in the aspect [1], the method comprising the steps of: heating the pressing plate with the plurality of heat sources; and pressing the substrate and the film with the heated pressing plate, wherein heating control is performed so that the central portion of the pressing plate and the peripheral portion thereof annularly surrounding the central portion are at the same temperature in the step of heating the pressing plate.

The inventors of the present disclosure have made studies to solve the aforementioned problems. As a result, the inventors have found that, for the purpose of making the thickness of the film made of resin or the like uniform, it is necessary to precisely control the temperature of the surface of the pressing plate separately for the central portion and the peripheral portion thereof, and have attained the present disclosure.

The laminating apparatus of the present disclosure is capable of preventing the protrusion of the film during pressing and ensuring the uniformity of the thickness of the film. This achieves the uniformity of the thickness of a resulting laminate.

DESCRIPTION OF EMBODIMENTS

Preferred embodiments according to the present disclosure will now be described in detail. It should be noted that the present disclosure is not limited to the preferred embodiments to be described below.

Figure 1:
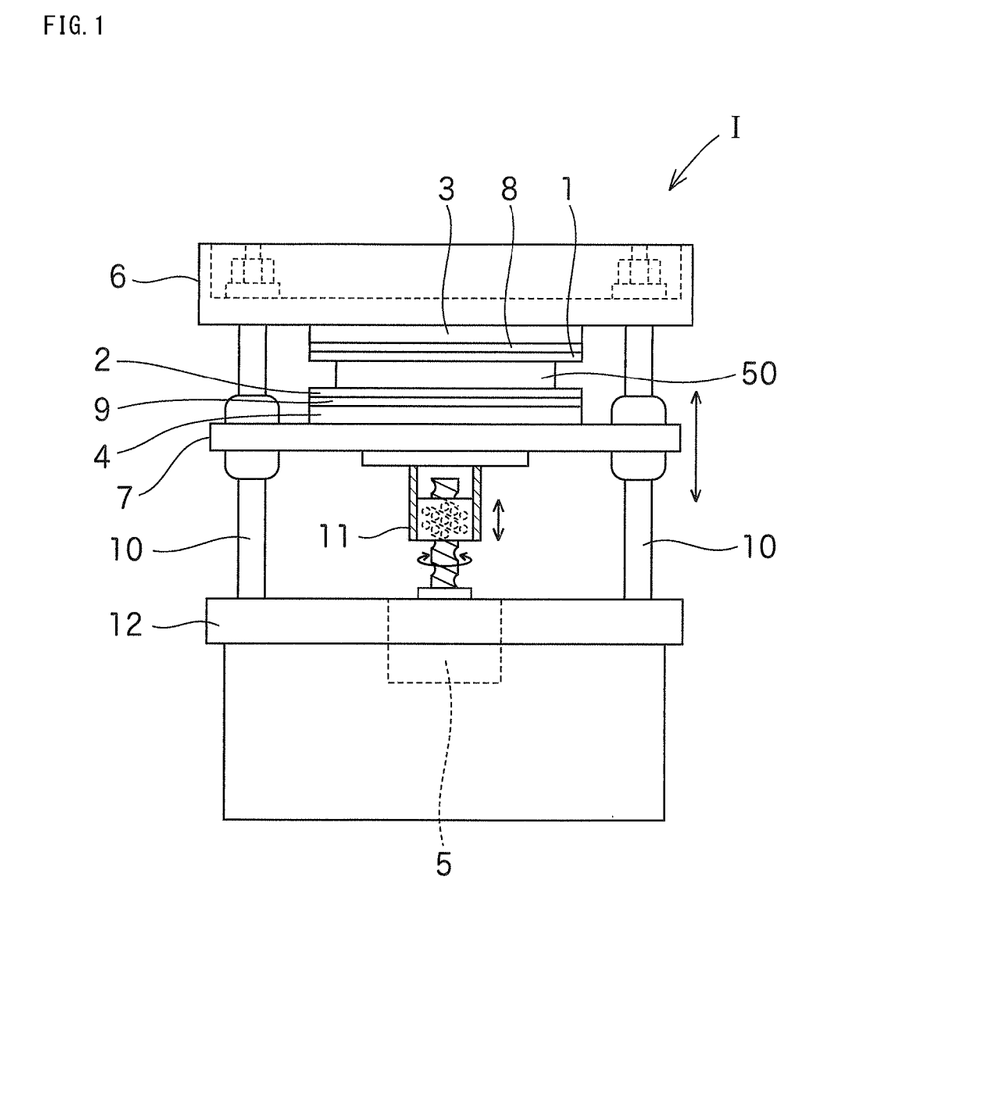
FIG. 1 is a schematic view of a laminating apparatus according to a first preferred embodiment of the present disclosure.

FIG. 1 shows a laminating apparatus I according to a first preferred embodiment of the present disclosure. This laminating apparatus I is an apparatus for laminating a substrate for a build-up board and a film for lamination together. In the laminating apparatus I, the substrate and the film (which are referred to collectively as a "workpiece 50" in some cases) are placed between an upper pressing plate 1 and a lower pressing plate 2, and the pressing plate 1 heated by an upper heating platen 3 and the pressing plate 2 heated by a lower heating platen 4 heat and press the workpiece 50 to manufacture a laminate in which the substrate and the film are integrated together.

In this preferred embodiment, the laminating apparatus I includes: a plurality of support posts 10 (only two are shown in FIG. 1) provided upright on a press stand 12; an upper press block 6 fixed to the support posts 10 with bolts, nuts and the like; a lower press block 7 vertically movably (back-and-forth movably) mounted to the support posts 10; and the like. This lower press block 7 is coupled to a servomotor 5 via a ball screw 11. The servomotor 5 allows the lower press block 7 to move vertically (move back and forth) (as the nuts are moved upwardly and downwardly by the shaft rotation of the ball screw 11). The reference numeral 8 designates a buffer material placed between the upper pressing plate 1 and the upper heating platen 3, and 9 designates a buffer material placed between the lower pressing plate 2 and the lower heating platen 4.

The lower press block 7 will be described below as a representative because the upper press block 6 and the lower press block 7 are similar in basic configuration.

The pressing plate 2 abuts against the workpiece 50 during pressing. Typically, the pressing plate 2 made of metal is used in consideration of heat resistance. Examples of such metal include stainless steel, iron, aluminum, and alloys of these metals. Stainless steel is preferably used because of its excellent rust resistance. In addition, a flexible metal plate is preferably used as the pressing plate 2. When used as the pressing plate 2, such a flexible metal plate has a thickness generally in the range of 0.1 to 10 mm, and preferably in the range of 1 to 3 mm. When the thickness of the flexible metal plate is in the preferable range, a resulting laminate has a more uniform thickness. It is also preferable that the surface of the pressing plate 2 is polished to a mirror finish because this allows the resulting laminate to have a more uniform thickness.

Figure 2:
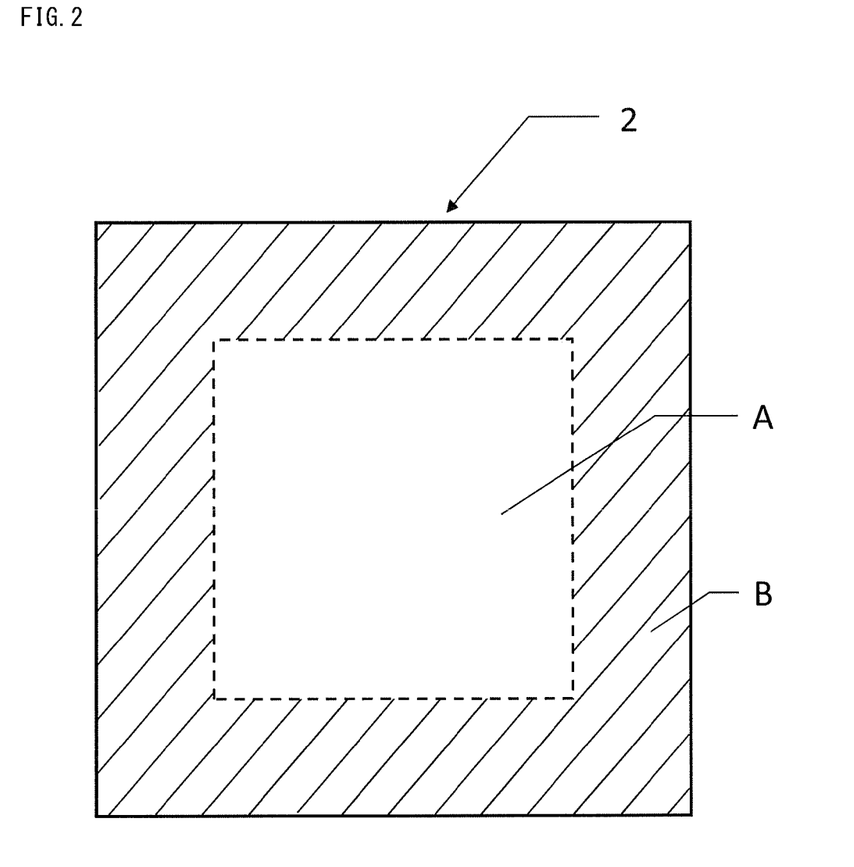
FIG. 2 is a plan view of a pressing plate in the laminating apparatus.

As shown in plan view in FIG. 2, the pressing plate 2 provided on the press block 7 is heated by the heating platen 4 capable of separately heating a central portion A (a central portion surrounded by broken lines in FIG. 2) and a peripheral portion B (a peripheral portion shaded with diagonal lines in FIG. 2) annularly surrounding the central portion A. The laminating apparatus I includes a plurality of control systems set up to perform heating control on heat sources provided in the heating platen 4.

Specifically, the aforementioned configuration is capable of controlling the heating so that the central portion A of the pressing plate 2 and the peripheral portion B thereof annularly surrounding the central portion A are at different temperatures. As a result, this allows the peripheral portion (the portion of the film that the peripheral portion B of the pressing plate 2 abuts against) and the central portion (the portion of the film that the central portion A of the pressing plate 2 abuts against) to differ in viscosity of the film. For example, if the viscosity of the peripheral portion is lower than that of the central portion, the peripheral portion itself serves as a stopper to effectively restrain the film from protruding.

On the other hand, the aforementioned configuration is capable of easily controlling the heating so that the central portion A of the pressing plate 2 and the peripheral portion B thereof annularly surrounding the central portion A are at the same temperature. The peripheral portion B of the pressing plate 2 has the property of being more susceptible to the temperature of outside air (an atmosphere in which the laminating apparatus I is installed) than the central portion A, so that heat escapes more easily from the peripheral portion B. For precise uniformity of the temperature of the entire pressing plate 2, it is necessary to create a difference between the degree of heating of the central portion A and the degree of heating of the peripheral portion B.

Therefore, the laminating apparatus according to the present disclosure is capable of effectively preventing the film from protruding during the pressing by controlling the heating temperature without any complicated configuration to manufacture a high-quality laminate having a uniform thickness at low costs. The control systems according to the present disclosure include a series of devices for controlling the heating temperature and control programs for the devices. The control systems include, for example, a temperature sensor (for example, a thermistor, a platinum resistance thermometer, a thermocouple, and the like) and a temperature controller (for example, a digital indicating controller, a PID controller, and an on/off controller). The control systems measure the temperature of the object to be heat-controlled, and switch the electric current in the heaters on/off according to the difference between the measured temperature and the target temperature.

Figure 3:
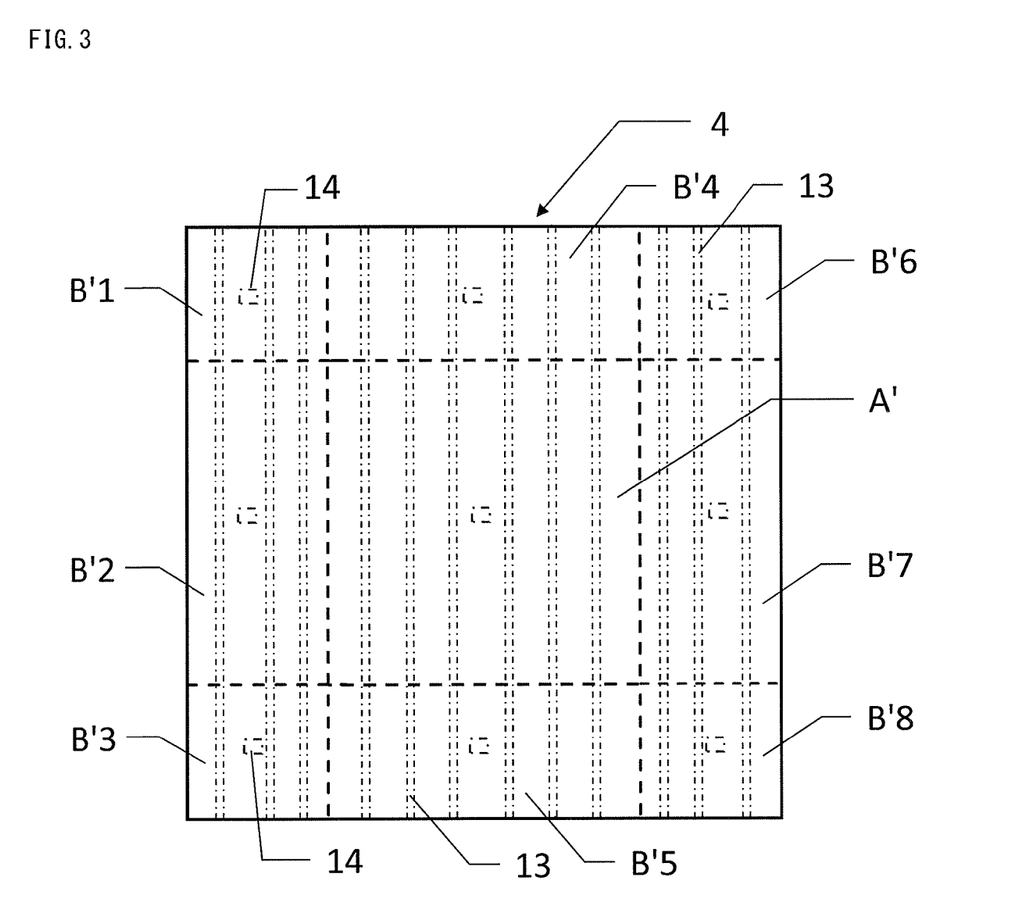
FIG. 3 is a view illustrating the configuration of heat sources in the laminating apparatus.

The use of the heating platen 4 shown in FIG. 3, for example, achieves a different temperature in a specific range of the surface of the lower pressing plate 2 as shown in FIG. 2. The heating platen 4 is placed on the pressing plate 2, with the buffer material 9 (with reference to FIG. 1) therebetween. The heating platen 4 includes a plurality of (in this example, 12) cartridge heaters 13 serving as heat sources, and a plurality of (in this example, nine) thermocouples 14 for control.

The heating platen 4 is capable of heating a central portion A' and peripheral portions B'1 to B'8 which are indicated by broken lines in FIG. 3 to different temperatures. For example, the peripheral portion B'4, the central portion A', and the peripheral portion B'5 which are shown in the middle column in FIG. 3 have six cartridge heaters 13 disposed across these divisions. Each of the cartridge heaters 13 includes a core made of ceramic or the like, a heating wire spirally wound around the core, and a metal pipe (sheath) covering the core and the heating wire. These cartridge heaters 13 are controlled for each of the aforementioned divisions (the peripheral portion B'4, the central portion A', and the peripheral portion B'5), and are capable of heating these divisions to different temperatures.

In this preferred embodiment, each of the cartridge heaters 13 includes three heating wires which are different in spacing between turns in the longitudinal direction of the core (between the divisions). As the spacing between turns of the heating wires is wider, the degree of heating is lower. On the other hand, as the spacing between turns of the heating wires is narrower, the degree of heating is higher. The spacing between turns of one of the three heating wires of each cartridge heater 13 is made narrow in a portion corresponding to one of the aforementioned divisions (the peripheral portion B'4, the central portion A', and the peripheral portion B'5), and made wide in the other portions. The spacing between turns of the two remaining heating wires of each cartridge heater 13 is made narrow in portions other than the aforementioned narrowed portion and different from each other, and made wide in the other portions. This allows the sufficient heating of only necessary divisions by simply switching each of the heating wires on and off. The cartridge heaters 13 are similarly disposed in the peripheral portions B'1 to B'3 and the peripheral portions B'6 to B'8 of the heating platen 4, and produce similar effects (the ability to heat these divisions to different temperatures).

Figure 4:
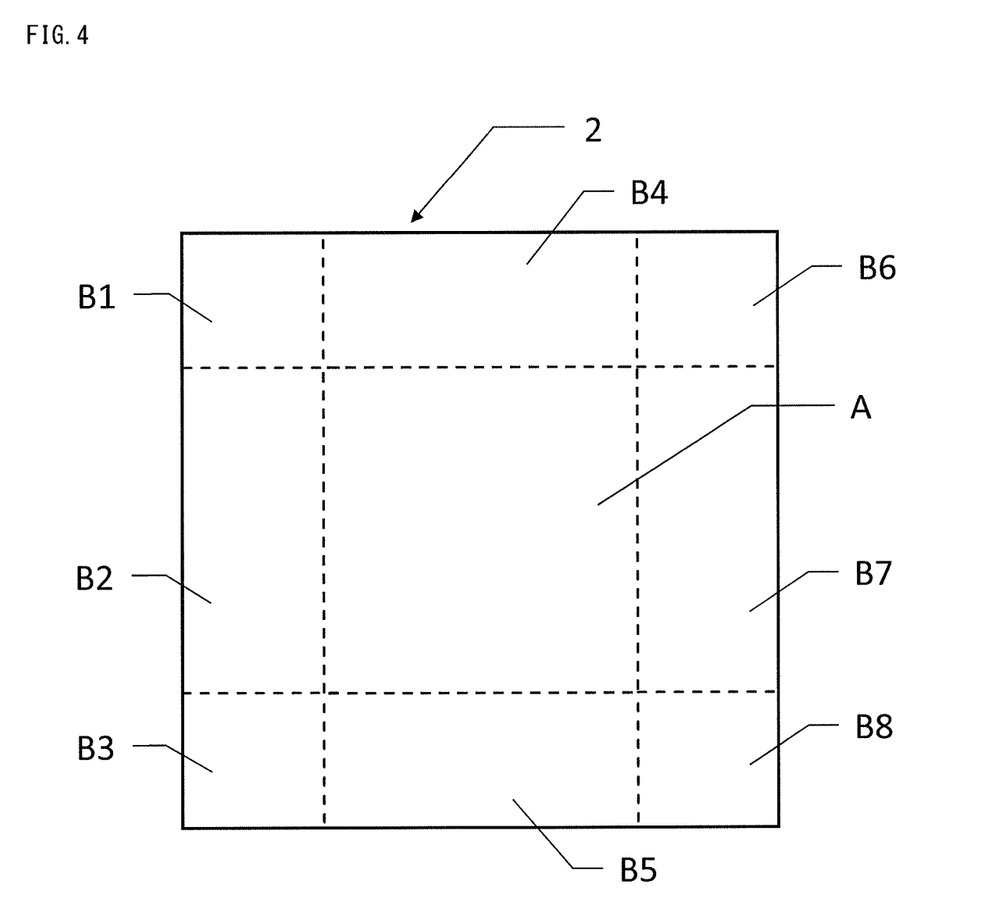
FIGS. 4 and 5 are views illustrating the shapes of a central portion of the pressing plate and a peripheral portion thereof annularly surrounding the central portion.

In the heating platen 4, the thermocouples 14 are disposed, one for each of the divisions (the central portion A' and the peripheral portions B'1 to B'8), as one of the components of the control systems. The thermocouples 14 finely measure the temperatures of the respective divisions of the heating platen 4, and feed back the measurement results to control mechanisms (not shown) of the cartridge heaters 13 to finely control the degree of heating for the respective divisions. This allows the central portion A and the peripheral portion B (divisions B1 to B8) of the pressing plate 2 disposed on the heating platen 4, with the buffer material 9 therebetween, as shown in FIG. 4 to be at different temperatures or at the same temperature.

The divisions of the pressing plate 2 are imaginarily provided for the design and temperature control of the heating platen 4, and are not clearly indicated by actually drawing lines or cutting in the heating platen 4. The expression "the ability to heat the divisions to different temperatures" means that it is only necessary to be able to heat the divisions imaginarily provided in the design of the heating platen 4 to different temperatures. Specifically, this means that the aforementioned expression includes an instance such that, even if a clear temperature difference is created between adjacent ones of the divisions imaginarily provided in the design of the heating platen 4 (the arrangement of the cartridge heaters 13 and the like), the temperature difference is such that the area in the vicinity of the imaginary division is heated to a temperature which is between the temperature of the central portion and the temperature of the peripheral portion, because the heating platen 4 has a continuous configuration. Due to the continuous configuration, the temperature in the vicinity of the imaginary division may be a gradual gradient from the temperature of the central portion to the temperature of the peripheral portion.

In the heating step in which the heating platen 4 heats the pressing plate 2, the temperature of the central portion A of the pressing plate 2 is generally in the range from room temperature to 180° C., although this may vary depending on the type and thickness of the film. Like the aforementioned temperature of the central portion A, the temperature of the peripheral portion B (the divisions B1 to B8) of the pressing plate 2 is also generally in the range from room temperature to 180° C.

The temperature difference between the central portion A and the peripheral portion B (the divisions B1 to B8) of the pressing plate 2 is generally preferably in the range of 0.1° C. to 50° C., more preferably in the range of 1° C. to 40° C., and further preferably in the range of 10° C. to 30° C., although this may vary depending on the type and thickness of the film. When the heating is controlled so that the central portion A and the peripheral portion B are at different temperatures, it is preferable that the temperature of the peripheral portion B is lower than that of the central portion A. Also, a temperature difference between the divisions of the peripheral portion B may be set or these divisions of the peripheral portion B may be set at the same temperature. An example of the setting of the temperature difference may include the setting of a temperature difference between the divisions B1 and B2 so that the temperature of a division in which the temperature is prone to decrease due to the influence of outside air is set to a higher temperature. In this manner, if the pressing plate 2 is configured so that a temperature difference is settable within the peripheral portion B, fine temperature control is achieved to make the thickness of the laminate more uniform. When the temperature of the pressing plate 2 is set lower in the peripheral portion B than in the central portion A, the film is prevented from protruding during the pressing with higher reliability. However, the central portion A and the peripheral portion B may be set at the same temperature, as the case may be.

The temperatures of the central portion A and the peripheral portion B of the pressing plate 2 are determined in the light of the temperatures of the heating platen 4 corresponding to the respective divisions (the temperatures measured by the thermocouples). For example, the temperatures of the central portion A and the peripheral portion B of the pressing plate 2 are determined by creating an association between the temperatures of the divisions of the heating platen 4 and the temperatures measured by the thermometers in contact with the corresponding divisions of the pressing plate 2.

The area ratio (B/A) of the peripheral portion B to the central portion A of the pressing plate 2 is generally in the range of 0.3 to 3, preferably in the range of 0.4 to 2, and more preferably in the range of 0.5 to 1. When the area ratio (B/A) is in the aforementioned range, the film is restrained from partially protruding with higher reliability.

Figure 5:
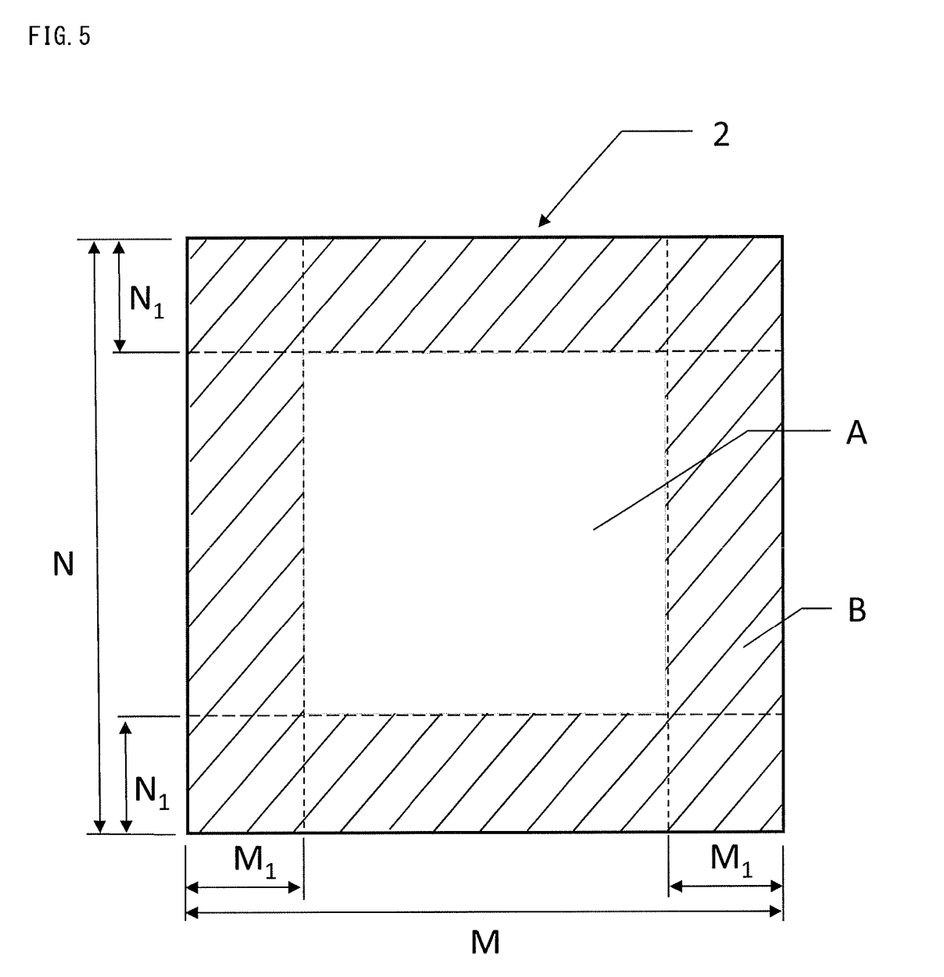

When the pressing plate 2 is rectangular in shape as seen in plan view as in the present preferred embodiment, the central portion A is preferably formed by a portion surrounded by a region that is 5% to 30% inward (a distance $N_1$ or $M_1$ inward) in the longitudinal directions (designated by N or M) from edges of the pressing plate 2, and is more preferably formed by a portion surrounded by a region that is 10% to 20% inward (the distance $N_1$ or $M_1$ inward), as shown in FIG. 5. When the central portion A is annularly surrounded by the aforementioned region, the film is restrained from protruding with higher reliability.

In the pressing step in which the heated pressing plates 1 and 2 press the workpiece 50, the time for the pressing of the workpiece 50 is generally in the range of 0.1 seconds to 60 minutes, preferably in the range of 0.5 seconds to 10 minutes, and more preferably in the range of one second to one minute, although this depends on the type of the workpiece 50 (the substrate and the film) to be pressed. When the pressing time is within the aforementioned time range, a resulting laminate 51 has an excellent balance between thickness uniformity and manufacturing efficiency.

Although this depends on the type of the workpiece 50 (the substrate and the film) to be pressed, the pressing in the aforementioned pressing step is typically performed by determining the thickness of the laminate 51 to be manufactured and then setting this thickness to the distance between the press blocks 6 and 7 at the end of the pressing. Specifically, the pressing in the pressing step includes: controlling the operation of rotating the servomotor 5 by the feedback of information on the distance between the press blocks 6 and 7; and slowing down or stopping the operation of rotating the servomotor 5 when a preset value (the aforementioned distance) is reached.

The substrate that constitutes the workpiece 50 is not particularly limited. Examples of the substrate used herein include substrates having relatively large irregularities such as an LED board in which light-emitting elements (LEDs) disposed in predetermined spaced apart relation are provided on an insulative board made of resin or ceramic, and substrates having relatively small irregularities such as a printed board having a pattern of copper or the like and a multiple laminated board for use in a build-up process.

The film that constitutes the workpiece 50 is not particularly limited. A film made of a resin composition excellent in stickiness, insulation properties, adhesive properties, hot-melt properties, and the like may be used as the film that constitutes the workpiece 50. For example, a resin film prepared by blending a thermosetting resin with a stabilizer, a curing agent, coloring matter or dyestuff, a lubricant, and the like may be used. Specific examples of the resin film include those made of silicone resin, polyimide resin, epoxy resin, acrylic resin, and the like.

Thus, the laminating apparatus according to the present disclosure is effectively used for the encapsulation of semiconductor devices on a wafer level, the protection of surfaces of semiconductor chips mounted on organic boards, the encapsulation of LED devices, the encapsulation of solar cells, the formation of resist layers on boards for use in semiconductors, LEDs, optical devices, and solar cells, and the like.

The buffer material 9 disposed between the pressing plate 2 and the heating platen 4 disperses the pressure applied during the pressing, and is generally made of rubber, plastic, cloth, paper, or the like. Rubber is preferably used for the buffer material 9 from the viewpoint of making the thickness of the laminate obtained by pressing more uniform, and fluororubber is particularly preferably used. The buffer material 9 may contain heat-resistant resin, glass fiber sheets, metal foil sheets, and the like. The containment of these materials is preferable because this increases durability.

The thickness of the buffer material 9 is generally in the range of 0.1 to 20 mm, preferably in the range of 0.2 to 10 mm, and more preferably in the range of 0.2 to 4 mm. The thickness of the buffer material 9 within the aforementioned range not only provides excellent elastic strength but also prevents the deformation of edge portions, which is preferable. It is also preferable that a surface of the buffer material 9 has a Shore A hardness of not less than 60 degrees. The Shore A hardness is measured pursuant to JIS Z 2246.

In this preferred embodiment, the lower pressing plate 2 is divided into the one central portion A and the one peripheral portion B (the eight divisions B1 to B8) for temperature control. However, the number of divisions into which the peripheral portion B is divided is not limited to eight or the peripheral portion B may have only one division without being divided. Further, each of the central portion A and the peripheral portion B may be divided into divisions for temperature control. In this case, the number of divisions into which each of the central portion A and the peripheral portion B is divided is in the range of 2 to 10, and preferably in the range of 2 to 8. Although this depends on the size of the pressing plate 2, each of the central portion A and the peripheral portion B divided into too many divisions causes adjacent ones of the divisions to interfere with each other to result in difficulties in fine temperature control.

In this preferred embodiment, the heating platen 4 includes the cartridge heaters 13 disposed across the multiple divisions. The shape of the cartridge heaters 13 is not limited to this. For example, the compact cartridge heaters 13 shaped to fit within the range of each division and equal in number to the divisions may be provided or the number of cartridge heaters 13 may be made different between the divisions. In addition, the heat sources disposed in the heating platen 4 need not be the cartridge heaters 13. For example, sheet heaters may be used as such heat sources.

In this preferred embodiment, the heating platen 3 and the heating platen 4 are provided on the upper press block 6 and the lower press block 7, respectively. However, if the film or the like is to be laminated to only one surface of the substrate, a heating platen may be provided on only one of the upper and lower press blocks 6 and 7 to heat only one of the upper and lower pressing plates 1 and 2. However, it is preferable to provide the heating platens on both the upper and lower press blocks in terms of heating efficiency and temperature control of the heating platens.

The shapes of the upper and lower pressing plates 1 and 2 are rectangular as seen in plan view in this preferred embodiment, but are not limited to this. As an example, the shapes of the upper and lower pressing plates 1 and 2 may be designed to be circular, elliptic, polygonal, or other shapes as seen in plan view in accordance with the shape of the workpiece 50.

The pressing plate 1 provided on the upper press block 6 and the pressing plate 2 provided on the lower press block 7 may be identical with or differ from each other in material, thickness, and degree of polishing.

The buffer material 8 placed on the upper press block 6 and the buffer material 9 placed on the lower press block 7 may be made of the same material or materials different from each other. Also, the buffer materials 8 and 9 may be identical with or differ from each other in thickness and Shore A hardness. Further, the buffer materials 8 and 9 need not be provided, for example, if the pressure during the pressing is sufficiently dispersed by the pressing plates 1 and 2.

In this preferred embodiment, the press block 7 is vertically moved (moved back and forth) by the operation of the servomotor 5. However, the vertical movement (back-and-forth movement) of the press block 7 is not limited to that performed by the operation of the servomotor 5. For example, an air cylinder or a hydraulic cylinder may be used in place of the servomotor 5 to move the press block 7. It is, however, preferable to use the servomotor 5 in terms of the ability to control the thickness of the laminate 51 more precisely.

For the heating control of the central portion A and the peripheral portion B of the lower pressing plate 2 at the same temperature in the laminating apparatus of the present disclosure, the central portion A' and the peripheral portions B'1 to B'8 are set at the same temperature in the heating platen 4 shown in FIG. 3, for example. Even in that case, the heating control of the heating platen 4 is performed separately for the central portion A' and for the peripheral portions B'1 to B'8. This is because the peripheral portion B of the pressing plate 2 is more susceptible to the temperature of outside air (an atmosphere in which the laminating apparatus I is installed) than the central portion A, so that heat escapes more easily from the peripheral portion B. Further, the heating control of the heating platen 4 is preferably performed separately among the peripheral portions B'1 to B'8. For example, it is preferable that the degree of heating of the peripheral portions B'1, B'3, B'6, and B'8 corresponding to the four corners of the heating platen 4 is made higher than the degree of heating of the other peripheral portions. This is because the four corners of the pressing plate 2 is more susceptible to outside air, so that heat escapes more easily from the four corners.

The temperature of each of the divisions of the heating platen 4 may be set, as appropriate, depending on the arrangement of the cartridge heaters 13, the shape and material of the pressing plate 2, and the like.

Second Preferred Embodiment

Figure 6:
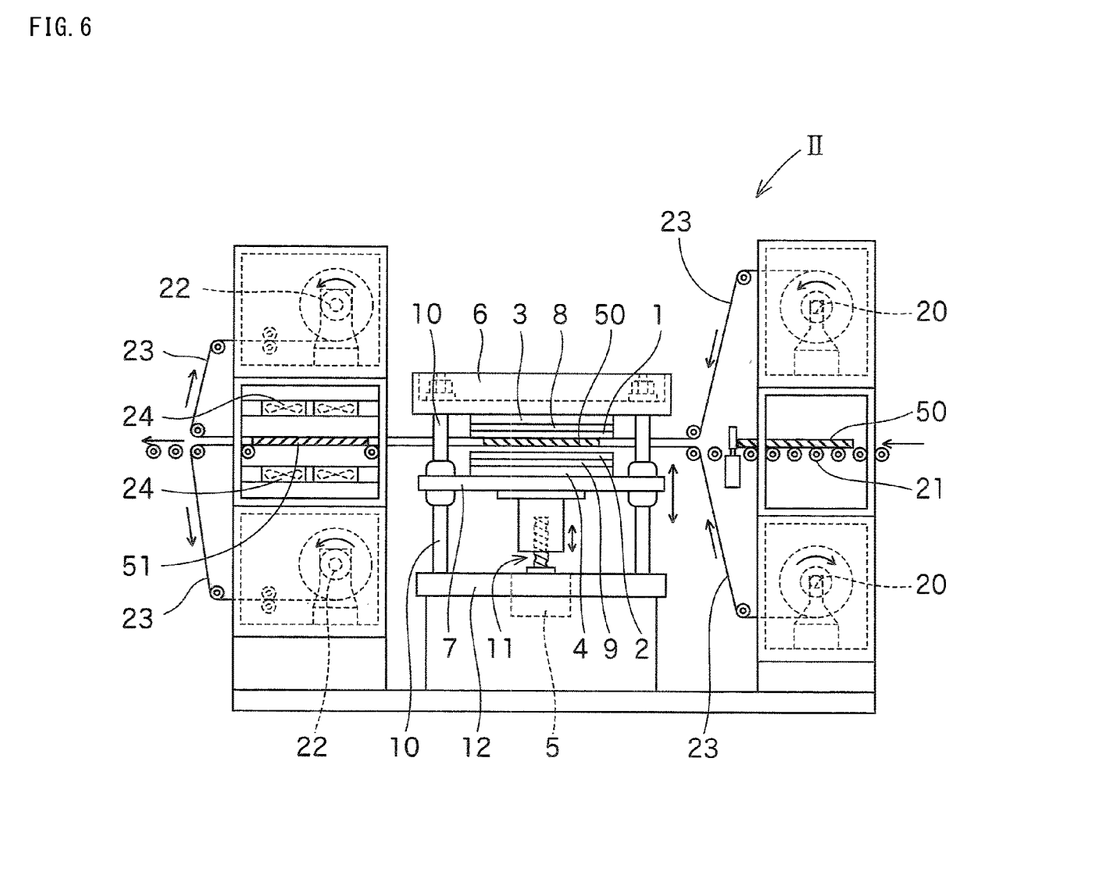
FIG. 6 is a schematic view of a laminating apparatus according to a second preferred embodiment of the present disclosure.
Figure 7:
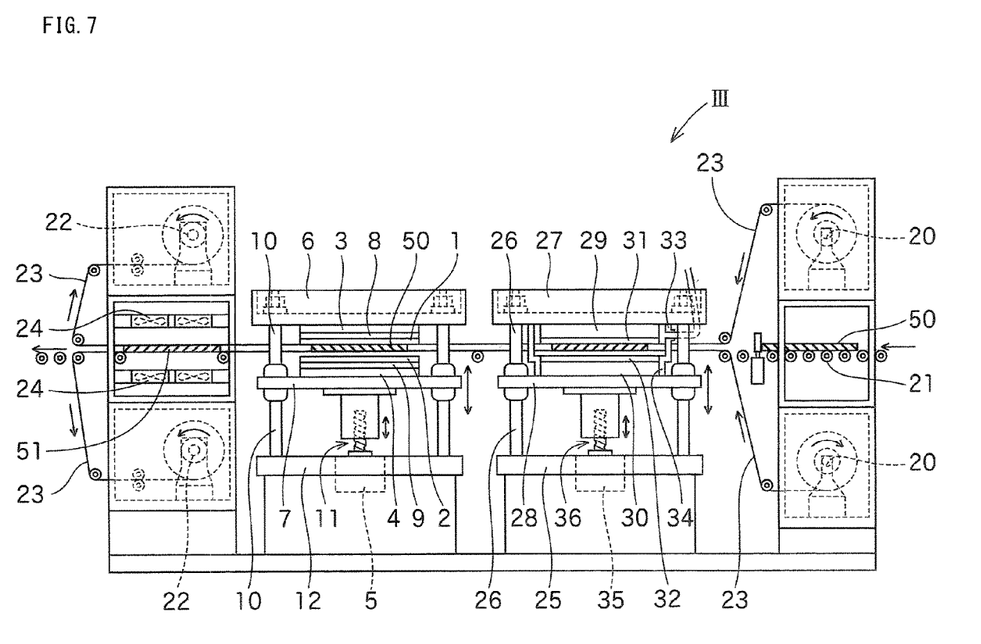
FIG. 7 is a schematic view of a laminating apparatus according to a third preferred embodiment of the present disclosure.

The laminating apparatus I including only the pressing device is illustrated in the first preferred embodiment. However, a laminating apparatus II including a film transport device that uses films to transport the workpiece 50 to the pressing device may be provided, as shown in FIG. 6.

The film transport device includes, for example, upper and lower transporting film unwinders 20 located at the starting point of a laminating step, a loading conveyor section 21 for loading the workpiece 50, transporting film winders 22 located at the ending point of the laminating step, transporting films 23 for transporting the workpiece 50 and the laminate 51, and the like.

Each workpiece 50 supplied from the loading conveyor section 21 is sandwiched and held between the upper and lower transporting films 23 unwound from the transporting film unwinders 20. Then, each workpiece 50 is pressed together with the transporting films 23 by the pressing device in synchronization with the travel of the transporting films 23 to become the laminate 51. Then, the laminate 51 is released from holding between the transporting films 23 and taken out. The reference numeral 24 in FIG. 6 designates a cooling fan for cooling the laminate 51.

The laminating apparatus II according to the second preferred embodiment of the present disclosure is capable of successively supplying workpieces 50 at predetermined intervals to the pressing device to thereby efficiently manufacture laminates 51.

Third Preferred Embodiment

A laminating apparatus III further including a vacuum press device upstream of the pressing device may be provided, as shown in FIG. 9.

The vacuum press device includes, for example, a plurality of support posts 26 provided upright on a press stand 25, an upper press block 27 fixed to the support posts 26, and a lower press block 28 vertically movably (back-and-forth movably) mounted to the support posts 26. This lower press block 28 is coupled to a servomotor 35 via a ball screw 36. The operation of the servomotor 35 allows the lower press block 28 to move vertically (move back and forth) (as the nuts are moved upwardly and downwardly by the shaft rotation of the ball screw 36).

Heat sources 29 and 30 including built-in heaters are mounted to the inside (press side) of the upper and lower press blocks 27 and 28, respectively, with heat-insulating materials (not shown) therebetween. Elastic pressing plates 31 and 32 made of heat-resistant rubber or the like are mounted to the inside (press side) of the heat sources 29 and 30, respectively. The upper and lower press blocks 27 and 28 are provided with respective vacuum frames 33 and 34 that are able to be integrated with the upper and lower press blocks 27 and 28. When the lower press block 28 is moved upwardly to a predetermined position, an enclosed space is formed between the press blocks 27 and 28. The vacuum press device is capable of reducing the pressure in this enclosed space, so that each workpiece 50 within the enclosed space is heated under a reduced pressure and is pressurized.

In the laminating apparatus III, the vacuum press device vacuum-presses each workpiece 50 before the pressing device presses each workpiece 50, so that the films fit the irregularities of the substrate with higher reliability. Then, the pressing device presses each workpiece 50 with the films fitting the irregularities of the substrate with reliability. This not only effectively prevents the formation of voids but also achieves the manufacture of laminates 51 having a more uniform thickness. The press blocks of the vacuum press device may include a plurality of heat sources capable of heating the pressing plates and a control system set up to perform the heating control on each of the heat sources, so that the heat sources are arranged so as to be able to separately heat the central portion of the pressing plates and the peripheral portion annularly surrounding the central portion. This provides a more uniform laminate in accordance with the type of the film and the degree of irregularities of the substrate.

EXAMPLES

An example using the laminating apparatus of the present disclosure will be described in conjunction with a comparative example. It should be noted that the present disclosure is not limited to the example.

Example 1

The lamination of a substrate α and a film β to be described below was performed by the laminating apparatus I shown in FIG. 1. In the upper and lower heating platens 3 and 4, the temperature of the central portion A' was set at 140° C., and the temperatures of the respective peripheral portions B'1 to B'8 were set at 120° C. The distance between the upper and lower pressing plates 1 and 2 was set at 0.506 mm. Pressing was performed for 40 seconds, whereby an intended laminate was obtained. In this laminating apparatus I, the size of the upper and lower pressing plates 1 and 2 is 640 mm×720 mm. The central portion A of the upper and lower pressing plates 1 and 2 is formed by a portion surrounded by a region that is the distance $N_1$ equal to 22% of N inward and the distance $M_1$ equal to 30% of M inward as shown in FIG. 5.

<Substrate α>

A copper clad laminate having a width of 510 mm, a length of 515 mm, and a thickness of 400 μm.

<Film β>

A film (interlayer insulation material) of epoxy resin having a width of 470 mm, a length of 480 mm, and a thickness of 27.5 μm.

Comparative Example 1

Using a laminating apparatus with only one system of temperature control of heating platens (temperature setting of the heating platens: 140° C.), the lamination of the substrate α and the film β was performed in the same manner as in Example 1, whereby an intended laminate was obtained.

The external appearance of the laminates obtained in Example 1 and Comparative Example 1 described above was visually observed. As a result, the laminate of Example 1 showed no film protrusion, whereas the laminate of Comparative Example 1 showed the protrusion of the film from the substrate, as shown in the conventional example in FIG. 8.

Although specific forms in the present disclosure have been described in the aforementioned example, the aforementioned example should be considered as merely illustrative and not restrictive. It is contemplated that various modifications evident to those skilled in the art could be made without departing from the scope of the present disclosure.

The laminating apparatus of the present disclosure is capable of laminating the substrate and the film used for the insulation between substrates while precisely controlling the thickness thereof. The laminating apparatus of the present disclosure is therefore suitable for the manufacture of products (laminates) that require control of finished product thickness, such as build-up boards and boards on which light emitting elements such as LEDs are mounted.

The invention claimed is:

1. A laminating apparatus, comprising:
a pressing device for pressing a substrate and a film, the pressing device including a press block movable back and forth,
a pressing plate mountable to the press block,
a plurality of heat sources capable of heating the pressing plate, and
a control system configured to perform heating control on the heat sources,
wherein the control system controls the heat sources such that a central portion of the pressing plate and a peripheral portion thereof annularly surrounding the central portion are heated to different temperatures from each other, thereby non-uniformly heating the pressing plate.

2. The laminating apparatus according to claim 1,
wherein the peripheral portion of the pressing plate is divided into a plurality of divisions,
wherein the divisions are provided with respective different heat sources and control systems, and
wherein the heating control of the heat sources is allowed for each of the divisions.

3. The laminating apparatus according to claim 1,
wherein a cartridge heater including a core and a heating wire spirally wound around the core is used as the heat sources, and
wherein the cartridge heater includes the heating wires which are different in spacing between turns between portions corresponding to the central portion and each of the divisions of the peripheral portion of the pressing plate.

4. The laminating apparatus according to claim 1,
wherein the pressing plate is rectangular in shape as seen in plan view, and
wherein the central portion of the pressing plate is formed by a portion surrounded by a region that is 5% to 30% inward in the longitudinal directions from edges of the pressing plate.

5. A method of laminating a substrate and a film through the use of a laminating apparatus as recited in claim 1, the method comprising the steps of:
heating the pressing plate with the plurality of heat sources; and
pressing the substrate and the film with the heated pressing plate,
wherein, in the step of heating the pressing plate, heating control is performed so that the central portion of the pressing plate and the peripheral portion thereof annularly surrounding the central portion are at temperatures different from each other, thereby non-uniformly heating the pressing plate, and a viscosity of a portion of the film corresponding to the peripheral portion of the pressing plate is lower than a viscosity of a portion of the film corresponding to the central portion of the pressing plate.

6. The method according to claim 5, wherein the heating control is performed so that a temperature difference between the central portion and the peripheral portion of the pressing plate is 0.1° to 50° C. in the step of heating the pressing plate.

7. The method according to claim 5, wherein the temperature of the peripheral portion of the pressing plate is set lower than that of the central portion thereof.

8. The method according to claim 5, wherein the heating control is performed so that a temperature difference between the central portion and the peripheral portion of the pressing plate is 1° to 40° C. in the step of heating the pressing plate.

9. The method according to claim 5, wherein the heating control is performed so that a temperature difference between the central portion and the peripheral portion of the pressing plate is 10° to 30° C. in the step of heating the pressing plate.

10. The laminating apparatus according to claim 1,
wherein a cartridge heater including a core and a plurality of heating wires spirally wound around the core is used as the heat sources,
wherein the peripheral portion of the pressing plate is divided into a plurality of divisions,
wherein the heating wires are different in spacing between turns in a longitudinal direction of the core in a portion corresponding to the central portion of the pressing plate and in portions corresponding to the divisions of the peripheral portion of the pressing plate,
wherein the spacing between turns of the heating wire of the cartridge heater is relatively narrow in a portion corresponding to one of the plurality of divisions of the peripheral portion,
wherein the spacing between turns of the heating wire of the cartridge heater is relatively wide in a portion other than the portion corresponding to the one of the plurality of divisions of the peripheral portion, and
wherein, in each of the plurality of heating wires, the portion having relatively narrow spacing between turns of the heating wire is at a position different from the portion having relatively narrow spacing between turns of the heating wire in other ones of the plurality of heating wires.

11. The laminating apparatus according to claim 10, wherein the control system controls the cartridge heater by switching each of the heating wires on and off such that the central portion of the pressing plate and the peripheral portion thereof annularly surrounding the central portion are heated to different temperatures from each other.

* * * * *